(12) United States Patent
Schleiferböck et al.

(10) Patent No.: US 12,044,659 B2
(45) Date of Patent: Jul. 23, 2024

(54) VIBRONIC MULTISENSOR

(71) Applicant: Endress+Hauser SE+Co. KG, Maulburg (DE)

(72) Inventors: Jan Schleiferböck, Rümmingen (DE); Tobias Brengartner, Emmendingen (DE); Sergey Lopatin, Lörrach (DE); Thorsten Springmann, Hausen (DE); Raphael Kuhnen, Schliengen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 287 days.

(21) Appl. No.: 17/618,329

(22) PCT Filed: May 6, 2020

(86) PCT No.: PCT/EP2020/062516
§ 371 (c)(1),
(2) Date: Dec. 10, 2021

(87) PCT Pub. No.: WO2020/249317
PCT Pub. Date: Dec. 17, 2020

(65) Prior Publication Data
US 2022/0365041 A1  Nov. 17, 2022

(30) Foreign Application Priority Data
Jun. 13, 2019  (DE) .......................... 102019116150.9

(51) Int. Cl.
*G01N 29/44* (2006.01)
*G01N 29/14* (2006.01)
(Continued)

(52) U.S. Cl.
CPC ......... *G01N 29/4436* (2013.01); *G01N 29/14* (2013.01); *G01N 29/326* (2013.01); *G01N 9/24* (2013.01); *G01N 11/16* (2013.01)

(58) Field of Classification Search
CPC .. G01N 29/4436; G01N 29/14; G01N 29/326; G01N 9/24; G01N 11/16; G01N 9/002; G01F 1/66; G01F 23/296
See application file for complete search history.

(56) References Cited

U.S. PATENT DOCUMENTS

| | | |
|---|---|---|
| 4,299,114 A | 11/1981 | Silvermetz et al. |
| 5,966,983 A | 10/1999 | Pfeiffer et al. |

(Continued)

FOREIGN PATENT DOCUMENTS

| | | |
|---|---|---|
| DE | 3149909 A1 | 6/1983 |
| DE | 10050299 A1 | 4/2002 |

(Continued)

*Primary Examiner* — Xin Y Zhong
(74) *Attorney, Agent, or Firm* — Christopher R. Powers; Endress+Hauser (USA) Holding, Inc.

(57) ABSTRACT

A device and a method for determining and/or monitoring at least one process variable of a medium include a sensor unit having a mechanically oscillatable unit, at least a first piezoelectric element, a temperature detection unit for determining and/or monitoring a temperature of the medium and an electronics unit. The device is embodied to excite the mechanically oscillatable unit by means of an excitation signal such that mechanical oscillations are executed, to receive mechanical oscillations of the oscillatable unit and convert them into a first received signal, to transmit a transmitted signal and to receive a second received signal. The electronics unit is embodied, based on the first and/or second received signal, to determine the at least one process variable and, based on a third received signal received from the temperature detection unit, to determine the temperature of the medium.

15 Claims, 4 Drawing Sheets

(51) Int. Cl.
 *G01N 29/32* (2006.01)
 *G01N 9/24* (2006.01)
 *G01N 11/16* (2006.01)

(56) References Cited

U.S. PATENT DOCUMENTS

2005/0262944 A1* 12/2005 Bennett .............. G01N 29/4427
 73/592
2009/0120169 A1* 5/2009 Chandler, Jr. ......... G01N 11/16
 29/25.35
2014/0352427 A1* 12/2014 Dreyer .................. G01F 23/296
 73/290 V

FOREIGN PATENT DOCUMENTS

| DE | 10057974 | A1 | 5/2002 |
|---|---|---|---|
| DE | 10350084 | A1 | 6/2005 |
| DE | 102005015547 | A1 | 10/2006 |
| DE | 102006033819 | A1 | 1/2008 |
| DE | 102006034105 | A1 | 1/2008 |
| DE | 102006045654 | B3 | 1/2008 |
| DE | 102007013557 | A1 | 2/2008 |
| DE | 102007043811 | A1 | 3/2009 |
| DE | 102009026685 | A1 | 12/2010 |
| DE | 102009028022 | A1 | 2/2011 |
| DE | 102010030982 | A1 | 1/2012 |
| DE | 102011013687 | A1 | 9/2012 |
| DE | 102012100728 | A1 | 8/2013 |
| DE | 102015112543 | A1 | 2/2017 |
| DE | 102015114286 | A1 | 3/2017 |
| DE | 102015102834 | A1 | 10/2017 |
| DE | 102016112743 | A1 | 1/2018 |
| DE | 102016120326 | A1 | 4/2018 |
| DE | 102017130527 | A1 | 6/2019 |
| DE | 102018127526 | A1 | 5/2020 |

* cited by examiner

VIBRONIC MULTISENSOR

CROSS-REFERENCE TO RELATED APPLICATIONS

The present application is related to and claims the priority benefit of German Patent Application No. DE 10 2019 116 150.9, filed on Jun. 13, 2019, and International Patent Application No. PCT/EP2020/062516, filed May 6, 2020, the entire contents of which are incorporated herein by reference.

TECHNICAL FIELD

The invention relates to a device for determining and/or monitoring at least one process variable of a medium, comprising a sensor unit having a mechanically oscillatable unit, at least one piezoelectric element, a unit for determining and/or monitoring temperature of the medium and an electronics unit. Furthermore, the invention relates to a method for determining and/or monitoring the at least one process variable of the medium. The medium is located in a containment, for example, in a container or in a pipeline.

BACKGROUND

Vibronic sensors are widely used in process and/or automation technology. In the case of fill level measuring devices, such have at least one mechanically oscillatable unit, such as, for example, an oscillatory fork, a single tine or a membrane. Such is excited during operation by means of a exciter/receiving unit, frequently in the form of an electromechanical transducer unit, such that mechanical oscillations are executed. The electromechanical transducer unit can be, for example, a piezoelectric drive or an electromagnetic drive. Corresponding field devices are produced by the Applicant in great variety and sold, for example, under the marks, LIQUIPHANT® and SOLIPHANT®. The underpinning measuring principles are known, in principle, from a large number of publications. The exciter/receiving unit excites the mechanically oscillatable unit by means of an electrical excitation signal, such that mechanical oscillations are executed. Conversely, the exciter/receiving unit can receive the mechanical oscillations of the mechanically oscillatable unit and convert them into an electrical, received signal. The exciter/receiving unit is correspondingly either a separate driving unit and a separate receiving unit, or a combined exciter/receiving unit.

In such case, the exciter/receiving unit is in many cases part of a feedback, electrical, oscillatory circuit, by means of which the exciting of the mechanically oscillatable unit occurs, such that mechanical oscillations are executed. For example, for a resonant oscillation, the oscillatory circuit condition must be fulfilled, according to which the amplification factor is and all phases arising in the oscillatory circuit sum to a multiple of 360°. For exciting and fulfilling the oscillatory circuit condition, a certain phase shift between the excitation signal and the received signal must be assured. Therefore, frequently, a predeterminable value for the phase shift, thus, a desired value for the phase shift between the excitation signal and the received signal, is set. For this, the state of the art provides the most varied of solutions, including both analog as well as also digital methods, such as described, for example, in DE102006034105A1, DE102007013557A1, DE102005015547A1, DE102009026685A1, DE102009028022A1, DE102010030982A1 or DE00102010030982A1.

Both the excitation signal as well as also the received signal are characterized by frequency ω, amplitude A and/or phase Φ. Correspondingly, changes in these variables are usually taken into consideration for determining the particular process variable. The process variable can be, for example, a fill level, a predetermined fill level, or the density or viscosity of the medium, as well as its flow. In the case of a vibronic limit level switch for liquids, it is distinguished, for example, whether the oscillatable unit is covered by the liquid or freely oscillating. These two states, the free state and the covered state, are distinguished, in such case, for example, based on different resonance frequencies, thus, based on a frequency shift.

The density and/or viscosity can, in turn, only be ascertained with such a measuring device, when the oscillatable unit is completely covered by the medium. In connection with determining the density and/or viscosity, likewise different options are described in the state of the art, such as, for example, those published in DE10050299A1, DE102007043811A1, DE10057974A1, DE102006033819A1, DE102015102834A1 or DE102016112743A1.

A number of process variables can be determined with a vibronic sensor and used for characterizing a given process. In many cases, however, for a comprehensive process monitoring and/or control, other information concerning the process, especially knowledge with reference to other physical and/or chemical process variables and/or parameters, are required. Such can be handled, for example, by integrating other field devices into the process. Then the measured values provided by the different measuring devices can be suitably further processed in a unit superordinated to the devices.

Now, it is, however, the case that the different measuring devices can have, on the one hand, different measurement accuracies. Moreover, drift- and/or aging effects can, in each case, be very different. Such effects can combine to make a given measuring, or process monitoring and/or -control, quite difficult, or inaccurate. Moreover, it can be difficult to detect the conditions of the individual field devices in ongoing operation. Thus, known from German patent application No. 102018127526.9, unpublished as of the earliest filing date of this application, is a vibronic multisensor, by means of which both the vibronic measuring principle as well as also the ultrasonic, measuring principle can be applied for determining and/or monitoring one or more process variables.

SUMMARY

Starting from the above-described state of the art, an object of the invention is further to enlarge the functionality of a vibronic sensor.

The object is achieved by the device as well as by the method as defined in the present disclosure.

As regards the device, the object is achieved by a device for determining and/or monitoring at least one process variable of a medium, comprising a sensor unit having a mechanically oscillatable unit, at least a first piezoelectric element and a temperature detecting unit for determining and/or monitoring temperature of the medium, and an electronics unit. The device is embodied to excite the mechanically oscillatable unit by means of an excitation signal, such that mechanical oscillations are executed, to receive mechanical oscillations of the oscillatable unit and to convert them into a first received signal, to transmit a transmitted signal, and to receive a second received signal. The electronics unit is, in turn, embodied, based on the first and/or second received signal(s), to determine the at least one process variable and, based on a third received signal received from the temperature detecting unit, to determine the temperature of the medium.

The mechanically oscillatable unit is, for example, a membrane, a single tine, an arrangement of at least two oscillatory elements, or an oscillatory fork. The at least one piezoelectric element can be arranged, for example, in the region of the oscillatable unit. It serves, on the one hand, as exciter/receiving unit for producing the mechanical oscillations of the mechanically oscillatable unit, which are produced by means of the excitation signal. The mechanical oscillations are, in turn, influenced by the properties of the medium, when the oscillatable unit is covered by medium, such that, based on the first received signal, which represents the oscillations of the oscillatable unit, information is generateable concerning the at least one process variable.

The piezoelectric element serves further for producing a transmitted signal, which is received in the form of the second received signal. When the transmitted signal on its path passes at least at times and sectionally through the medium, it is likewise influenced by the physical and/or chemical properties of the medium and can be taken correspondingly into consideration for determining a process variable of the medium.

Thus, it is possible according to the invention to implement at least two measuring principles in a single device. The sensor unit, on the one hand, executes mechanical oscillations; additionally, a transmitted signal is transmitted. In reaction to the mechanical oscillations and to the transmitted signal, two received signals are received and can be evaluated, for example, as regards at least two different process variables. The two received signals can, in such case, advantageously be evaluated independently of one another. Thus, according to the invention, the number of ascertainable process variables can be significantly increased, this resulting in a higher functionality of the sensor and in a supplemented application domain.

Moreover, the device of the invention includes a temperature detecting unit for determining and/or monitoring temperature of the medium. The temperature detecting unit includes a temperature sensor, for example. The temperature sensor can be operated, for example, by means of a temperature signal. Based on a third received signal received from the temperature detecting unit, especially from the temperature sensor, then the temperature can be ascertained, for example, as third process variable. Temperature influences the most varied of other process variables of the medium. By the supplemental determining and/or monitoring of temperature, the accuracy of measurement of the multisensor can be accordingly significantly improved and the functionality of the sensor supplemented.

In an advantageous embodiment, the sensor unit includes at least first and second piezoelectric elements, wherein the first and second piezoelectric elements are embodied to excite the mechanically oscillatable unit by means of an excitation signal, such that mechanical oscillations are executed, and to receive mechanical oscillations of the oscillatable unit and to convert them into a first received signal, wherein the first piezoelectric element is embodied to transmit a transmitted signal, and wherein the second piezoelectric element is embodied to receive the transmitted signal in the form of a second received signal. However, more than two piezoelectric elements can be present, which can be arranged at different positions relative to the oscillatable unit.

In an additional advantageous embodiment, the mechanically oscillatable unit is an oscillatory fork having first and second oscillatory elements, wherein the first piezoelectric element is arranged, at least partially, in the first oscillatory element and the second piezoelectric element is arranged, at least partially, in the second oscillatory element. Corresponding embodiments of a sensor unit are described, for example, in DE102012100728A1 as well as in the German patent application No. 102017130527.0 unpublished as of the earliest filing date of this application. Comprehensive reference is taken to these two applications in the context of the present invention. The embodiments of the sensor unit described in these two documents are examples of suitable structural embodiments of the sensor unit. It is, for example, not absolutely necessary to arrange the piezoelectric elements exclusively in the region of the oscillatory elements. Rather, piezoelectric elements can also be arranged in the region of the membrane or in additional oscillatory elements not used for the vibronic excitation, but nevertheless likewise applied on the membrane.

Another embodiment of the device includes that the temperature detecting unit for determining and/or monitoring temperature comprises a temperature sensor in the form of a resistance element or a thermocouple.

Advantageously, the temperature detecting unit for determining and/or monitoring temperature is arranged in such a manner that it has a best possible thermal coupling to the medium. In such case, a difference between the temperature of the medium and the temperature of the sensor unit is small. The temperature detecting unit should correspondingly be arranged in a region of the device, which at least at times and/or partially will come in contact with the medium. The temperature detecting unit can be arranged, for example, in the region or in the vicinity of the oscillatable unit. It is likewise advantageous that the sensor unit be so embodied that its thermal capacitance is as small as possible. In such case, a response time for a temperature determination after a change of temperature of the medium is small.

Another preferred embodiment of the device includes that the sensor device comprises a unit for determining and/or monitoring a pressure and/or a device for determining and/or monitoring a conductivity and/or capacitance of the medium. Because of the implementing of additional measuring principles in a single sensor, the application range as well as the measuring accuracies of the sensor can be still further broadened and increased.

The object of the invention is achieved, furthermore, by a method for determining and/or monitoring at least one process variable of a medium, wherein:
  a sensor unit is excited by means of an excitation signal, such that mechanical oscillations are executed;
  the mechanical oscillations are received by the sensor unit and converted into a first received signal;
  the sensor unit transmits a transmitted signal and receives a second received signal; and
  based on the first and/or second received signal, the at least one process variable is ascertained and, based on a third received signal, a temperature of the medium is ascertained.

The method is especially usable for a device according to one of the above described embodiments. It is, on the one hand, an option that the sensor unit operates at the same time by means of the excitation signal and by means of the transmitted signal, wherein the excitation signal and the transmitted signal are superimposed on one another. Alternatively, the sensor unit can, however, also operate alternately by means of the excitation signal and by means of the transmitted signal.

The excitation signal is, for example, an electrical signal having at least one predeterminable frequency, especially a sinusoidal or rectangular signal. Preferably, the mechanically oscillatable unit is excited at least at times to execute resonant oscillations. The mechanical oscillations are influenced by the medium surrounding the oscillatable unit, such that, based on a received signal representing the oscillations, information concerning different properties of the medium can be obtained.

The transmitted signal is preferably an ultrasonic signal, especially a pulsed, ultrasonic signal, especially at least one ultrasonic pulse. Accordingly, performed as second applied measuring method according to the invention is an ultrasonically based measuring method. The transmitted signal passes, at least partially, through the medium and its properties are influenced by the medium. Correspondingly, based on the second received signal, likewise information concerning different media can be obtained.

With the method of the invention, a plurality of different process variables are ascertainable by means of different measuring principles. Moreover, in each case, an influence of temperature can be taken into consideration. Different process variables can be advantageously determined independently of one another, such that a comprehensive analysis of a process by means of a single measurement device is enabled. Because the same sensor unit is used for a plurality of measuring methods, moreover, the accuracy of the measurements can be significantly increased. Moreover, based on the different measuring principles, a condition monitoring of the device can be performed. For such purpose, numerous embodiments for the method of the invention are possible, of which some preferred variants are given below.

A preferred embodiment provides that at least two different process variables are ascertained, wherein a first process variable is ascertained based on the first received signal, and wherein a second process variable is ascertained based on the second received signal.

Another preferred embodiment includes that an influence of temperature of the medium on at least the first and/or second received signal or at least one process variable derived from a received signal is compensated.

Another embodiment of the method provides that information concerning a process, which the medium undergoes, is obtained based on temperature of the medium. For example, based on temperature determined in each case, a mixing of different media with different temperatures can be perceived and/or monitored. In such case, short-term fluctuations of temperature of the mixture can occur abruptly, which can influence the determining of the particular process variable negatively. Likewise, it can be detected, whether a particular sensor is being operated outside of an allowable working range for the temperature. Another possible task is the observation of a cleaning process performed for a sensor. In the case of a cleaning process, the different cleaning cycles can be perceived and/or monitored. Frequently, there follow treatments of the sensor unit at high temperatures, for example, with hot steam, cold water rinsings, which mean large changes of the temperatures ascertained by means of the temperature detection unit for determining and/or monitoring temperature. It is likewise an option to conduct a calibration of the sensor unit during individual process steps of a cleaning process, for example, during a cold rinsing procedure.

In an especially preferred embodiment of the method of the invention, a first value for the temperature is determined by means of the temperature detection unit for determining and/or monitoring temperature, and/or wherein a second value for the temperature is ascertained based on an electromechanical efficiency of the first and/or second piezoelectric element. The determination of temperature based on an electromechanical efficiency of a piezoelectric element is described in detail in DE102016120326A1, to which comprehensive reference is taken in the context of the present invention.

Then the first and second values for the temperature are advantageously compared with one another.

Likewise advantageously, a diagnosis of at least one component of the sensor unit is performed based on the comparison. The device is especially a device of the invention.

The diagnosis can include, for example, on the one hand, information concerning the temperature detection unit for determining and/or monitoring temperature or information concerning condition of the first and/or second piezoelectric element. Advantageously in this way, a plausibility check of individual, applied measuring principles, especially of the two received signals, as well as of a response signal received from the temperature detection unit for determining and/or monitoring temperature can be performed.

Another especially preferred embodiment includes that the at least one process variable is a predeterminable fill level, density, viscosity, velocity of sound or a variable derived from at least one of these variables. Especially preferably, the density of the medium is determined based on the first received signal and the velocity of sound within the medium is determined based on the second received signal. It is understood, however, that, besides the, in this case, explicitly mentioned process variables, also other process variables and/or parameters, which are accessible by means of the two performed measurements, can likewise be determined and taken into consideration for characterizing a particular process.

An embodiment of the method of the invention provides that a reference value for density is ascertained based on the velocity of sound, wherein the reference value is compared by means of a value for density ascertained from the first received signal. Preferably, a concentration of a reference substance dissolved in a reference medium in a specifiable container is ascertained based on the velocity of sound ascertained from the second received signal. From the concentration, then the reference value for density of the reference medium can be ascertained. Additionally, a measured value for density can be ascertained from the first received signal. The two values for density can be compared with one another. Especially, the value for density ascertained from the first received signal can be adjusted based on the reference value for density ascertained from the second received signal. In this way, a disadvantageous influence of the geometry of the utilized containment on the vibronic determining of density can be compensated.

An especially preferred embodiment includes that a first concentration of a first substance contained in the medium and a second concentration of a second substance contained in the medium are ascertained based on the first and second received signals and/or based on the first and second process variables. In the state of the art for such an analysis of the medium for two different substances, as a rule, two separate measuring devices are required, which provide different measured variables. According to the invention, in contrast, information concerning two different components in a medium can be reliably obtained by means of a single device.

A preferred application of the method concerns monitoring a fermentation process. In a fermentation process, sugar is converted into ethanol. In order to be able to assure a quality monitoring, it is necessary to determine both the concentration of sugar as well as also that of ethanol. Such is possible according to the invention.

Lastly, an advantageous embodiment of the method includes that it is ascertained, based on the first and second received signals and/or based on the first and second process variables, whether an accretion has formed on the sensor unit and/or whether a drift and/or aging of the sensor unit is present. The two received signals usually behave differently from one another as a function of an accretion on the probe unit, a drift or an aging in the region of the sensor unit. The presence of an accretion, a drift or an aging can correspondingly be detected, for example, based on a consideration of the two received signals and/or process variables as a function of time.

Advantageously, the first and second received signals, the first and second process variables, and/or the first and second received signals and/or the first and second process variables as a function of time are compared with one another. From the comparison, then the presence of an accretion, a drift or an aging of the sensor unit can be indicated. Since at least two received signals, or process variables, are accessible, a high accuracy as regards the information concerning an accretion, a drift or an aging can be achieved. Because of the implementing according to the invention of two different measurements with a single sensor unit, the presence of accretion, or a drift or an aging of the sensor unit can be reliably detected.

In an additional, especially preferred embodiment, in the case of determining and/or monitoring at least one process variable or in the case of determining a variable derived from at least one process variable and/or at least one received signal, an influence of an accretion, a drift and/or an aging of the sensor unit on the first and/or second received signal is reduced or compensated. The influence of an accretion, a drift and/or aging of the sensor unit can, accordingly, be taken into consideration in the case of determining and/or monitoring the particular process variable, such that the process variable can be determined without being affected by the presence of an accretion, a drift and/or aging. For reducing or for compensating the influence, for example, a suitable, especially process dependent, algorithm can be furnished, based on which a value for the particular process variable not corrupted by the influence of the accretion, the drift and/or aging of the sensor unit is ascertainable. Thus, an improved accuracy of measurement can be achieved as well as a method for predictive maintenance provided.

Let it be noted, furthermore, that the embodiments described in connection with the device of the invention can be applied mutatis mutandis also for the method of the invention and vice versa.

BRIEF DESCRIPTION OF THE DRAWINGS

The invention will now be explained in greater detail based on the appended drawing, the figures of which show as follows.

Figure 1:
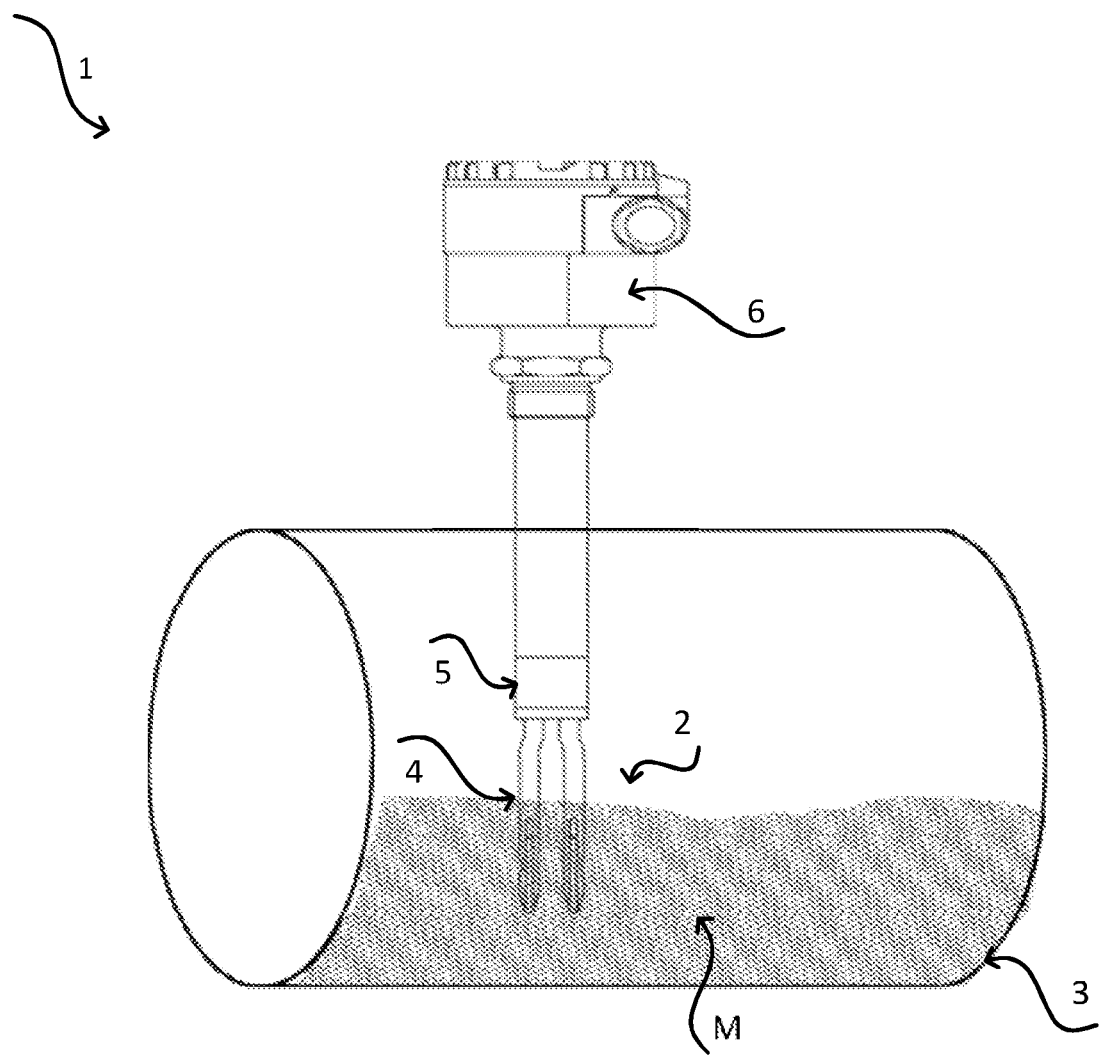
FIG. 1 shows a schematic view of a vibronic sensor according to the state of the art.

In the figures, equal elements are provided with equal reference characters.

DETAILED DESCRIPTION

FIG. 1 shows a vibronic sensor 1 having a sensor unit 2. The sensor has a mechanically oscillatable unit 4 in the form of an oscillatory fork, which is partially immersed in a medium M located in a container 3. The oscillatable unit 4 is excited by means of the exciter/receiving unit 5, such that the oscillatable unit 4 executes mechanical oscillations, and can be, for example, a piezoelectric stack or bimorph drive. Other vibronic sensors 1 may use, for example, electromagnetic exciter/receiving units 5. It is possible to use a single exciter/receiving unit 5, which serves both for exciting the mechanical oscillations as well as also for their detection. Likewise, it is an option to implement a separate driving unit and a separate receiving unit. FIG. 1 shows, furthermore, an electronics unit 6, by means of which signal registration, evaluation and/or feeding occurs.

Shown in FIG. 2, by way of example, are different sensor units 2, which are suitable for performing a method of the invention. The mechanically oscillatable unit 4 shown in FIG. 2a includes, applied on a base 8, two oscillatory elements 9a,9b, which are also referred to as fork tines. Optionally, moreover, in each case, paddles (not shown) can be formed at the ends of the two oscillatory elements 9a,9b. Provided in each of the two oscillatory elements 9a,9b is, in each case, an, especially pocket-like, hollow space 10a, 10b, in which, in each case, at least one piezoelectric element 11a, 11b of the exciter/receiving unit 5 is arranged. Preferably, the piezoelectric elements 11a and 11b are cast within the hollow spaces 10a and 10b. The hollow spaces 10a, 10b can, in such case, be so created that the two piezoelectric elements 11a, 11b are located completely or partially in the region of the two oscillatory elements 9a, 9b. Such an arrangement as well as similar arrangements are described at length in DE102012100728A1.

Figure 2A:
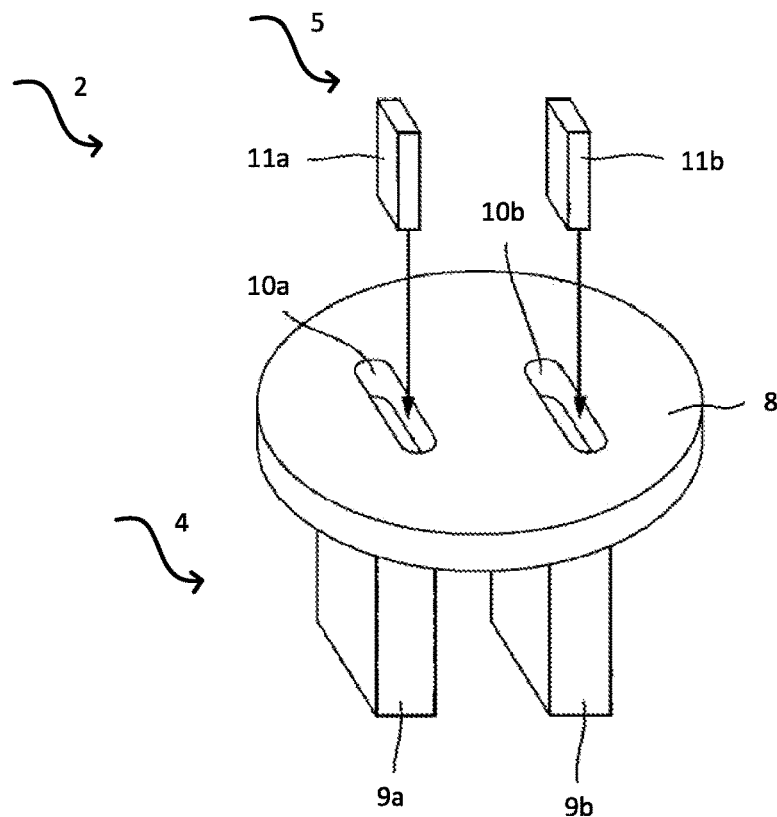
FIGS. 2a-2d show embodiments of a sensor unit suitable for performing the method of the present disclosure.
Figure 2B:
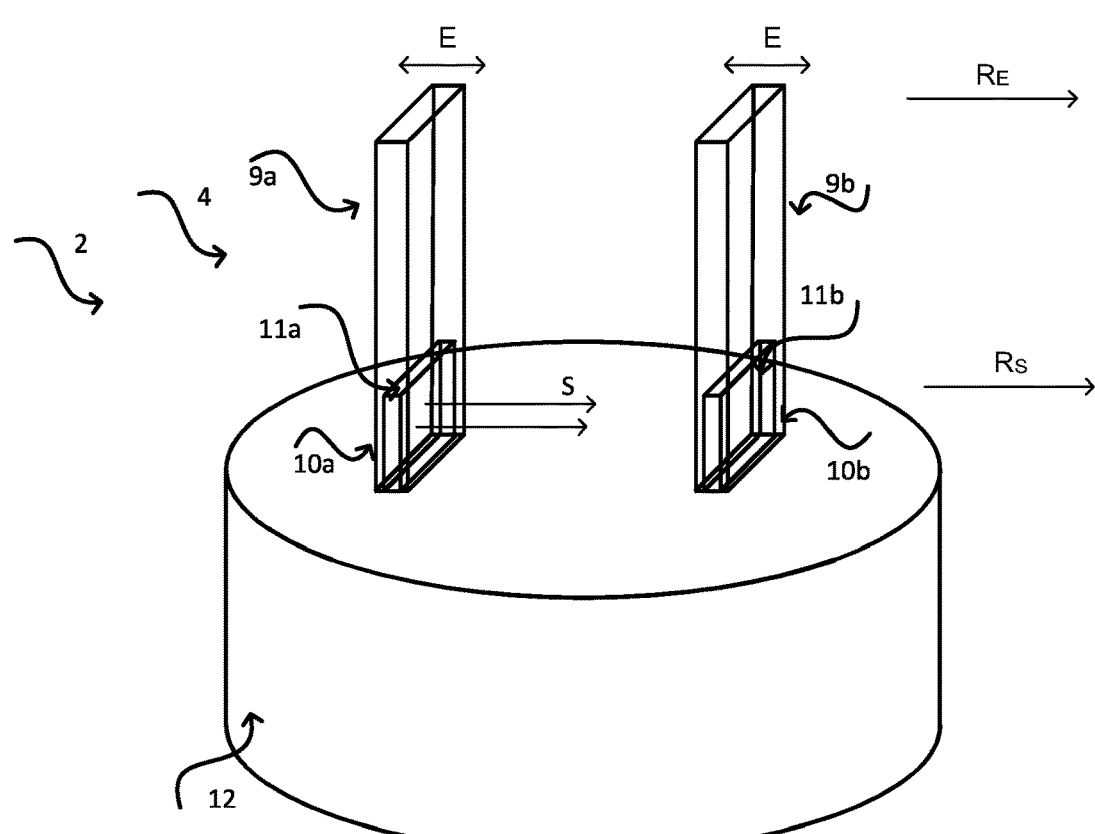

Another example of an embodiment of a sensor unit 2 is shown in FIG. 2b. The mechanically oscillatable unit 4 in such case includes two parallel, rod shaped, oscillatory elements 9a, 9b, which are mounted on a disc shaped element 12 and which can be excited separately from one another to execute mechanical oscillations, and in the case of which the oscillations can likewise be received and evaluated separately from one another. The two oscillatory elements 9a and 9b have, in each case, a hollow space 10a and 10b, into which, in each case, at least one piezoelectric element 11a, 11b is arranged in the region facing the disc shaped element 12. Regarding the embodiment of FIG. 2b, reference is made to DE102017130527A1, which was unpublished as of the earliest filing date of this application.

As shown schematically in FIG. 2b, according to the invention, the sensor unit 2 is, on the one hand, supplied with an excitation signal E, in such a manner that the oscillatable unit 4 is excited such that mechanical oscillations are executed. The oscillations are produced, in such case, by means of the two piezoelectric elements 11a and 11b. The two piezoelectric elements can be supplied with the same excitation signal E or the first oscillatory element 11a can be supplied with a first excitation signal $E_1$ and the second oscillatory element 11b with a second excitation signal $E_2$.

Likewise, an option is that a first received signal $R_E$ is received based on the mechanical oscillations, or that separate received signals $R_{E1}$, $R_{E2}$ are received by each of the oscillatory elements 9a,9b.

Moreover, transmitted from the first piezoelectric element 11a is a transmitted signal S, which is received by the second piezoelectric element 11b in the form of a second received signal $R_S$. Since the two piezoelectric elements 11a and 11b are arranged at least in the region of the oscillatory elements 9a and 9b, the transmitted signal S passes through the medium M when the sensor unit 2 is in contact with the medium M and is correspondingly influenced by the properties of the medium M. Preferably, the transmitted signal S is an, especially pulsed, ultrasonic signal, having especially at least one ultrasonic pulse. Likewise, it is, however, also an option that the transmitted signal S from the first piezoelectric element 11a is transmitted in the region of the first oscillatory element 9a and reflected on the second oscillatory element 9b. In such case, the second received signal $R_S$ is received by the first piezoelectric element 11a. The transmitted signal S passes, in this case, twice through the medium M, this leading to a doubling of a travel time T of the transmitted signal S Besides these two illustrated embodiments of a device 1 of the invention, numerous other variants are possible, which likewise fall within the scope of the invention. For example, it is possible in the embodiments of FIGS. 2a and 2b to use only one piezoelectric element 11a,11b and to arrange such at least in one of the two oscillatory elements 9a, 9b. In such case, the piezoelectric element 11a serves for producing the excitation signal, and the transmitted signal S, as well as for receiving the first $R_1$ and second received signal $R_2$. The transmitted signal is, in this case, reflected on the second oscillatory element 9b lacking piezoelectric element 11b.

Figure 2C:
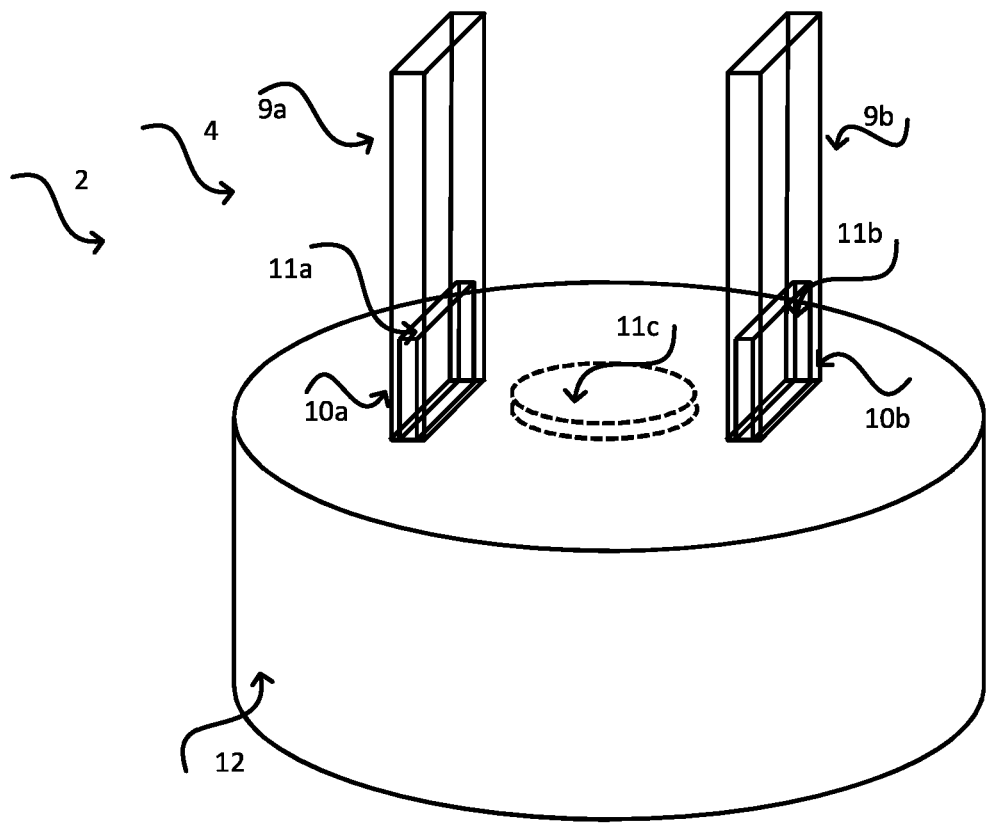

FIG. 2c shows another embodiment, by way of example. In such case, a third piezoelectric element 11c is provided in the region of the membrane 12. The third piezoelectric element 11c serves to produce the excitation signal E and for receiving the first received signal $R_1$, while the first 11a and second piezoelectric element 11b serve to produce the transmitted signal S and to receive the second received signal $R_2$. Alternatively, it is, for example, possible to produce with the first 11a and/or second piezoelectric element 11b the excitation signal E and the transmitted signal S as well as to receive the second received signal $R_2$, wherein the third piezoelectric element 11c serves for receiving the first received signal $R_1$. Likewise, it is possible to produce the transmitted signal S with the first 11a and/or second piezoelectric element 11b and the excitation signal E with the third piezoelectric element 11c and to receive the first $R_1$ and/or second received signal $R_2$ with the first 11a and/or second piezoelectric element 11b. Also in the case of FIG. 2c, it is possible in other embodiments to omit the first 11a or second piezoelectric element 11b.

Figure 2D:
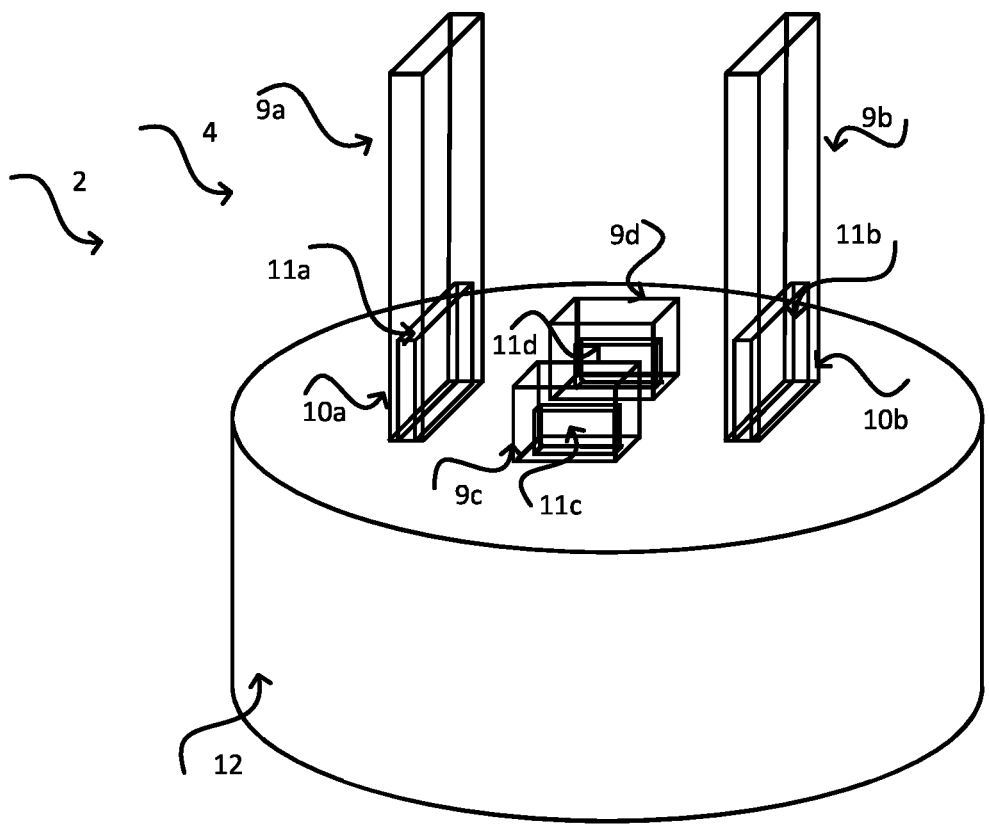

Another embodiment of the device 1 is shown in FIG. 2d. The device is based on the embodiment of FIG. 2b and includes a third 9c and a fourth oscillatory element 9d. These do not serve, however, for oscillation production. Rather, a third 11c and a fourth piezoelectric element 11d are arranged in the additional elements 9c, 9d, respectively. In such case, vibronic measuring is performed by means of the first two piezoelectric elements 11a, 11b and ultrasonic measuring is performed by means of the other two piezoelectric elements 11c,11d. Also in this case, for each measuring principle, one piezoelectric element, e.g., 11b and 11d, can be omitted. For reasons of symmetry, it is, however, advantageous, always to use two additional oscillatory elements 9c, 9d.

The first $R_E$ and second received signal $R_S$ result from different measuring methods and can be evaluated independently of one another as regards at least one process variable P. In this regard, reference is made to German patent application No. 102018127526.9, which was unpublished as of the earliest filing date of this application and to which comprehensive reference is taken in the context of the present invention.

Figure 3:
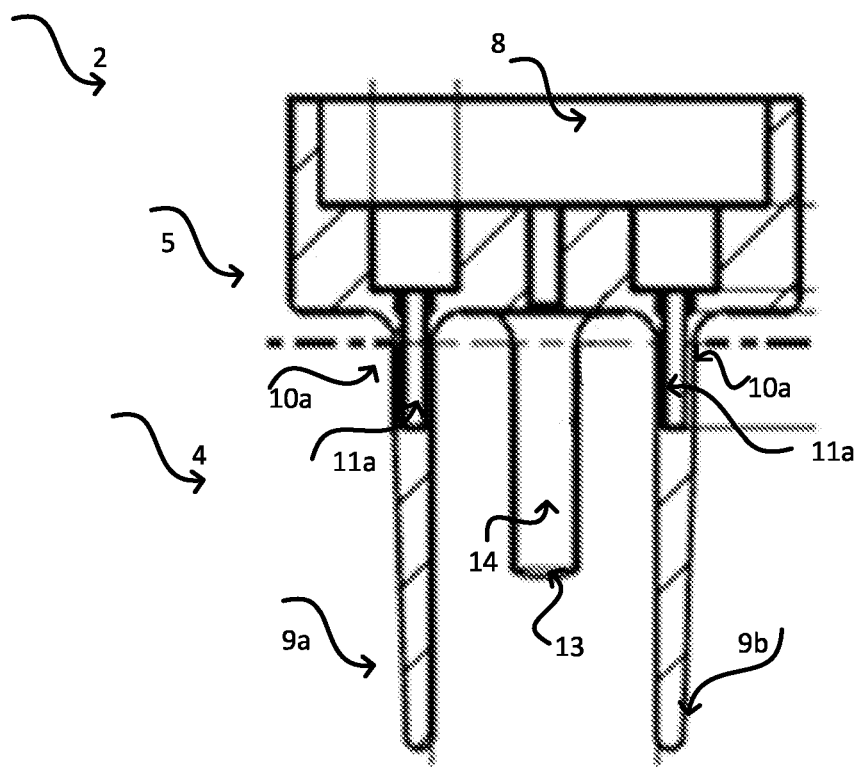
FIG. 3 shows an embodiment of a device of the present disclosure having means for determining the temperature of the medium.

Moreover, according to the invention, the temperature of the medium can be determined and/or monitored. For this, the device of the invention has, such as shown in FIG. 3, a temperature detection unit for determining and/or monitoring temperature. FIG. 3 shows a sensor unit 2 analogous to the embodiment of FIG. 2a. Arranged between the two oscillatory elements 9a and 9b of the oscillatable unit 4 (embodied in the form of an oscillatory fork) is the temperature detection unit 13 for determining and/or monitoring temperature T of the medium. Temperature detection unit 13 comprises a temperature sensor 14, for example, in the form of a resistance element or a thermocouple.

Alternatively, the temperature detection unit 13 for determining and/or monitoring temperature can be arranged, for example, in the region of an oscillatory element 9a, 9b or in the region of the base 8.

The invention claimed is:

1. A device for determining and/or monitoring at least one process variable of a medium, the device comprising:
    a sensor unit comprising:
        a mechanically oscillatable unit;
        at least one piezoelectric element; and
        a temperature detection unit configured to determine and/or monitor a temperature of the medium,
        wherein the sensor unit is configured to excite the mechanically oscillatable unit using an excitation signal such that mechanical oscillations are executed, to detect the mechanical oscillations of the oscillatable unit, to convert the mechanical oscillations into a first received signal, to transmit a transmitted signal, and to receive a second received signal, wherein the transmitted signal and the second received signal are ultrasonic signals; and
    an electronics unit configured to determine at least two different process variables, wherein a first process variable is determined based on the first received signal, and wherein a second process variable is determined based on the second received signal, and
    wherein the electronics unit is further configured to:
        determine, based on a third received signal from the temperature detection unit, the temperature of the medium;
        determine a density of the medium based on the first received signal;
        determine a reference value for the density of the medium based on the second received signal;
        compare the determined density to the reference value; and
        adjust the determined density based on the reference value as to compensate for an effect of a container in which the medium is disposed.

2. The device of claim 1, wherein:
    the at least one piezoelectric element includes a first piezoelectric element and a second piezoelectric element;
    the first piezoelectric element and the second piezoelectric element are adapted to excite the mechanically oscillatable unit via the excitation signal such that mechanical oscillations are executed, to detect the mechanical oscillations of the oscillatable unit, and to convert the mechanical oscillations into the first received signal;

the first piezoelectric element is adapted to transmit the transmitted signal; and the second piezoelectric element is adapted to receive the transmitted signal as the second received signal.

3. The device of claim 2, wherein the mechanically oscillatable unit is an oscillatory fork including a first oscillatory element and a second oscillatory element, and wherein the first piezoelectric element is disposed, at least partially, in the first oscillatory element, and the second piezoelectric element is disposed, at least partially, in the second oscillatory element.

4. The device of claim 1, wherein the temperature detecting unit for determining and/or monitoring temperature comprises a temperature sensor, wherein the temperature sensor is a resistance element or a thermocouple.

5. The device of claim 1, wherein the sensor unit further comprises a device configured to determine and/or monitor a pressure of the medium and/or a device configured to determine and/or monitor a conductivity and/or capacitance of the medium.

6. A method for determining and/or monitoring at least one process variable of a medium using a sensor unit, the method comprising:

exciting a sensor unit via an excitation signal such that the sensor unit executes mechanical oscillations;

detecting the mechanical oscillations using the sensor unit;

converting the detected mechanical oscillations into a first received signal;

transmitting a transmitted signal using the sensor unit;

receiving a second received signal via the sensor unit; and determining at least two process variables, wherein a first process variable is determined based on the first received signal, and wherein a second process variable is determined based on the second received signal;

based on a third received signal, determining a temperature of the medium;

determining a density of the medium based on the first received signal;

determining a reference value for the density of the medium based on the second received signal;

comparing the determined density with the reference value; and adjusting the determined density based on the reference value as to compensate for an effect of a container in which the medium is disposed.

7. The method of claim 6, the method further comprising compensating for an influence of the temperature of the medium on the first received signal and/or second received signal.

8. The method of claim 6, the method further comprising, determining information concerning a process that the medium undergoes based on the temperature of the medium.

9. The method of claim 6, wherein a first value for the temperature is determined by a temperature detection unit configured to determine and/or monitor temperature, and/or wherein a second value for the temperature is determined based on an electromechanical efficiency of a first piezoelectric element and/or a second piezoelectric element of the sensor unit.

10. The method of claim 9, the method further comprising comparing the first value with the second value for the temperature.

11. The method of claim 10, the method further comprising diagnosing a condition of at least one component of the sensor unit based on the comparison.

12. The method of claim 6, wherein the first process variable is a fill level, a density, a viscosity, or a variable derived from at least one of the foregoing process variables, and wherein the second process variable is a velocity of sound.

13. The method of claim 6, the method further comprising determining a first concentration of a first substance contained in the medium and a second concentration of a second substance contained in the medium based on the first received signal and the second received signal and/or based on the first process variable and the second process variable.

14. The method of claim 6, the method further comprising determining, based on the first received signal and second received signal and/or based on the first process variable and the second process variable, whether an accretion has formed on the sensor unit and/or whether a drift and/or an aging of the sensor unit has occurred.

15. The method of claim 14, the method further comprising reducing or compensating for an influence of at least one of the accretion on, the drift of, and the aging of the sensor unit on the first received signal and/or on the second received signal.

* * * * *